United States Patent [19]

Ajmera

[11] Patent Number: 5,916,624
[45] Date of Patent: Jun. 29, 1999

[54] PROCESS FOR PREPARING INDIVIDUALLY FROZEN PULSES

[75] Inventor: Shreyas H. Ajmera, Maple, Canada

[73] Assignee: Seenergy Foods Inc., Woodbridge, Canada

[21] Appl. No.: 08/864,410

[22] Filed: May 28, 1997

Related U.S. Application Data

[60] Provisional application No. 60/018,680, May 30, 1996.

[51] Int. Cl.$^6$ ....................................................... A23L 1/30
[52] U.S. Cl. .......................... 426/634; 426/352; 426/377; 426/444; 426/524
[58] Field of Search ..................................... 426/634, 385, 426/444, 456, 640, 459, 460, 524, 352, 377

[56] References Cited

U.S. PATENT DOCUMENTS 3,869,556   3/1975   Rockland et al. ....................... 426/459

FOREIGN PATENT DOCUMENTS 696049   8/1953   United Kingdom ................... 426/444

OTHER PUBLICATIONS

Food Science 5$^{th}$ Edition Norman N. Potter, Joseph H. Hotchkiss (pp. 187,190,191,217), 1995.

*Primary Examiner*—David Lacey
*Assistant Examiner*—Hao Mai
*Attorney, Agent, or Firm*—Bereskin & Parr

[57] ABSTRACT

A process for preparing individually frozen pulses, particularly beans, comprising the steps of: soaking dried pulses in water; boiling the pulses in water; quickly surface-drying the pulses in hot forced air and flash freezing the dried pulses.

12 Claims, No Drawings

PROCESS FOR PREPARING INDIVIDUALLY FROZEN PULSES

This application claims the benefit of U.S. provisional Application 60/018,680, filed May 30, 1996.

FIELD OF THE INVENTION

The invention relates generally to a process for preparing individually frozen pulses, particularly beans. The process involves the steps of soaking dried pulses, boiling the soaked pulses, quickly surface-drying the pulses in hot forced air and flash freezing them.

BACKGROUND OF THE INVENTION

Pulses are edible leguminous seeds, such as peas, beans, lentils etc. which have long been recognized as an important and inexpensive component of the human diet, providing a rich, low-fat source of protein, complex carbohydrates and dietary fibre.

The production of pulses with a long shelf life has been the subject of much investigation in the food industry. Traditionally pulses have been prepared for storage by dehydration. Dried pulses are widely available to consumers, who may reconstitute the dried pulses as desired by rehydrating them in water. The lengthy time required to rehydrate pulses to a soft edible texture by soaking and boiling is a disadvantage for many consumers and for commercial food preparation facilities. Attempts have been made to reduce the rehydration time required, for example by mechanically perforating the husks of the pulses, or by the addition of enzymes or softeners during the drying process (U.S. Pat. No. 4,214,007 to Hase). However, such methods frequently result in pulses which have undergone extensive changes in their appearance, structure and taste and which have unfavorable organoleptic properties. U.S. Pat. No. 3,867,553 to Hitze et al. describes the use of pectolytic enzymes in efforts to improve the properties of rehydrated peas. Hungarian Patent No. 193673 to Kurnik describes a process for freeze drying beans and peas.

In efforts to reduce the preparation time of pulses, dried pulses may be processed through a pre-cooking step prior to drying. Pre-cooked dried pulses, particularly beans have shown a tendency to crack, burst and become floury or grainy (U.S. Pat. No. 3,510,313 to Steinkraus). Complex processes have been tried in efforts to prepare pre-cooked dried beans having improved organoleptic properties. U.S. Pat. No. 4,333,955 describes a process for preparing fast cooking dried beans by boiling and soaking the beans, subjecting them to enzymatic treatment, an acidic boiling step and drying in superheated steam.

The appearance, taste, speed of rehydration and the inclusion of additives remain problematic with dried pulses and it has proven difficult to obtain beans which may be instantly reconstituted to provide pulses which duplicate the texture, taste and mouth-feel of freshly cooked pulses. Alternative methods for storing pulses include canning or freezing. Canned pulses are prepared at high temperature and have reduced food value and a soft mushy texture.

Generally frozen pulses, such as peas are prepared by blanching and freezing. Such pulses still require significant cooking before they are ready to eat. A process for preparing frozen, cooked, table-ready rehydrated legumes is described in U.S. Pat. No. 4,900,578 to Bakker. The process involves the steps of soaking, cooking and freezing the beans. However, such process steps tend to result in beans of poor appearance, which have wrinkled or fractured skins and which become agglomerated together on freezing. It has also proven difficult to use this process for preparing individually frozen pulses using commercial production line equipment, as the cooked pulses stick to the production line equipment, freezing units and belts and to each other. Attempts to scrape the freezing pulses off the belts results in significant damage to the integrity of the beans.

There is a need for a process for preparing individually frozen cooked pulses which may be instantaneously and conveniently restored to the soft edible appearance and condition of boiled pulses. In particular, there is a need for such a process by which pulses may be individually frozen on a commercial moving belt production line.

BRIEF SUMMARY OF THE INVENTION

The present invention provides a process for preparing individually frozen cooked pulses. The present inventor has surprisingly found that quickly and gently drying the surface of cooked pulses with agitation in hot forced air prior to rapid flash freezing provides individually frozen pulses, which do not stick together when frozen and which have intact non-wrinkled or fractured skins. The frozen pulses may be conveniently defrosted to provide intact firm pulses having the appearance, texture and taste of intact, freshly cooked pulses. In particular the present inventor has determined that a vibrating bed drier may be used to quickly surface dry beans prior to flash freezing.

Broadly stated one aspect of the invention provides a process for preparing individually frozen pulses, comprising the steps of: soaking dried pulses in water; boiling the pulses in water; quickly surface-drying the pulses in hot forced air and flash freezing the dried pulses. It is an advantage of the process that the surface-drying and flash freezing may conveniently be carried out on a moving belt production line, without the pulses sticking to the equipment or to each other.

In an aspect of the invention, the pulses are beans, such as Romano or garbanzo beans. In embodiments of the invention, the beans are soaked for between 8 to 16 hours at between 5 to 70° C., and boiled. In a further embodiment, the surface-drying is sufficient to remove from about 1 to 2%, preferably about 2% of total moisture content from the beans. In particular embodiments, the hot forced air is at a temperature of from about 110 to 160° F. and is applied for a time of from about 20 to 60 seconds. Another embodiment provides a process where the beans are surface-dried in hot forced air in a vibrating bed drier, preferably in a moving belt vibrating bed drier. The dried beans may be flash frozen in a nitrogen tunnel freezer.

The invention provides, in a particular embodiment, a process for preparing individually frozen beans, comprising the steps of: soaking dried beans in water for about from 8 to 16 hours; boiling the beans in water for about from 12 to 13 minutes; quickly surface-drying the pulses for a time of about 30 to 45 seconds in hot forced air at a temperature of from about 110 to 160° F. in a vibrating bed drier to remove about 2% of total moisture content from the beans, and; flash freezing the surface-dried beans in a nitrogen tunnel freezer.

DETAILED DESCRIPTION OF THE INVENTION

As previously noted, the present invention is directed to a process for preparing individually frozen pulses, comprising the steps of: soaking dried pulses in water; boiling the pulses in water; quickly surface-drying the pulses in hot forced air and flash freezing the dried pulses.

A wide range of pulses may be frozen by the process of the invention, including all edible beans, peas and lentils. Suitable beans include members of the genus Phaseolus, including the large white, small white, pinto, red kidney, lima, adzuki, peyin, scarlet runners etc.; members of the genus Vicia, including broad beans; members of the genus Vigna, including blackeye, Cuba, and Catiang; and members of the genus Soja including soybeans. Peas which may be frozen by the process of the invention include members of the genus Pisum, including smooth and wrinkled peas and yellow and green peas; and the genus Cicer, including garbanzo or chick peas. Lentils include members of the genus Lens. Preferably, the pulses are dried beans, most preferably Romano beans, garbanzo beans or kidney beans.

It will be appreciated that fresh pulses may also be frozen using a modified process of the invention. Where the pulses are fresh, the soaking step may be omitted and the boiling time may be shortened. The process of the invention will be particularly described as it relates to beans. It will be appreciated however, that other pulses, such as peas and lentils may also be frozen by the process of the invention.

The beans are subject to a preliminary soak or immersion in water to initiate the influx of water into the beans, to cause the swelling of bean tissue and to facilitate extraction of undesirable components during the boiling step. During soaking the total moisture content of the beans should increase to about from 40 to 60%, preferably from 45 to 55%. The water temperature during the preliminary soak may be room temperature or from about 5 to 70° C., preferably from about 30 to 50° C. The soaking time may be selected based on the type of pulse being processed. Preferably, the beans should be soaked for about 6 to 20 hours, preferably from about 8 to 16 hours. After soaking the beans may be drained in water to remove any undesirable components.

The beans may be boiled in a kettle at atmospheric pressure or in a pressure cooker under elevated pressures and temperatures. Preferably, the beans are boiled at atmospheric pressure in kettles having a steam jacket pressure of from 5 to 50 psi, preferably 10 to 40 psi, most preferably from 20 to 30 psi at temperatures of from 98 to 100° C., preferably from 98 to 99° C. The length of the boiling step depends on the type of pulses being processed. The beans may be boiled for a time of about from 8 to 25 minutes, preferably from 10 to 15 minutes, most preferably from 12 to 13 minutes. During the boiling step the beans are softened and cooked and they take up water. The total moisture content of the beans may increase to about 50 to 70%, preferably from 55 to 65, most preferably from 62 to 65%. The boiling step extracts some of the undesirable astringent components of the beans, such as tannins, saponnins, flatulence causing enzymes etc.

After boiling, the beans should be briefly cooled, for example in cool water and drained. The ensuing drying step is carried out quickly to dry excess water from the surface of the beans, without extracting water from the interior of the beans and without damaging the outer coat of the beans. This may be accomplished using hot forced air at a temperature of from 60 to 200, preferably from 80 to 180, most preferably from 110 to 160° F. The beans may be dried for from about 5 to 75 seconds, preferably from 10 to 60 seconds, most preferably from 30 to 45 seconds.

During the drying step the beans should be gently agitated. It is preferred that the hot air surface-drying is carried out in a vibrating bed drier, most preferably in a moving belt vibrating bed drier, which moves the beans rapidly through the hot air. The vibrating bed drier or similar type of agitating drier rapidly and gently shakes and blows excess moisture from the entire bean surface. It is important that moisture is not extracted from the interior of the cooked beans as this would result in a hardening of the bean texture and a wrinkling or rupturing of the bean coat. The surface-drying should remove from about 0.5 to 3%, preferably from 1 to 2%, most preferably about 2% of the moisture from the cooked drained beans. The small amount of moisture loss may be regained by frosting during flash freezing. It is an advantage of the invention that the frozen beans thus have a moisture content which is almost identical to that of freshly boiled and drained beans. The beans therefore have the texture and firmness of freshly boiled beans and are suitable for eating directly once thawed without re-hydration or further preparation.

The dried beans-may be flash frozen. In a production line, the beans may be carried on a conveyor belt through a nitrogen tunnel freezer where the beans are flash frozen. It is an advantage of the process of the invention that the surface-dried beans do not stick to the conveyor belt, to each other, or to any other part of the production line. Once frozen, the beans may be packed or wrapped, for example in plastic wrap, plastic bags, trays or bulk boxes with plastic linen or in paper board sleeves. Optionally the beans may be sealed in nitrogen enriched atmosphere or under vacuum. The wrapped beans may be bulk packaged in boxes. The beans may be stored in a deep freezer, preferably at about a setting of about −18° C.

Beans prepared by the process of the invention may be prepared for consumption for conventional techniques, for example, by thawing in a microwave, at room temperature, in steam or in hot water. The beans may be removed from the freezer in the desired quantity and added directly to salads, soups, casseroles, chilis, stews, curries etc. without the need for cooking or rehydrating. When thawed, the beans have the appearance of freshly cooked beans, and are firm with no, or almost no, cracks or fissures. The pulses have the mouthfeel, taste and organoleptic properties of freshly cooked beans.

It will be appreciated that the frozen beans may be packaged with a range of additives and seasonings. The frozen beans may advantageously be incorporated into kits, such as chili kits, for instantaneous reconstitution. It will also be appreciated that a wide range of suitable seasonings known in the art may be added to the frozen beans at any stage of the process The invention will be more fully understood by reference to the following examples. However, these examples are merely intended to illustrate embodiments of the invention and are not to be construed to limit the scope of the invention.

EXAMPLES

Example 1

Garbanzo Beans 45.36 Kg of dried garbanzo beans with a moisture content of 9.8% were soaked in water for 12 or 16 hours. Moisture content of beans was determined using an electronic moisture meter. After soaking 100.0 Kg of drained beans, with a moisture content of 55.5%, were recovered. The beans were then boiled for 12 minutes in a kettle with a steam jacket set at a pressure of 30 psi, reaching a temperature of 99° C. The cooked beans weighed 110.0 Kg and had a moisture content of 64.7%. After cooking, the beans were cooled to approximately 27° C. and quickly surface dried for 30 to 45 seconds in a vibrating bed dryer on a 12.5 feet long moving belt, at a temperature of from 110 to 160° F. Beans exiting the drier had a moisture content of 63.37% and were rapidly frozen in a nitrogen tunnel freezer, kept at −80° F., to flash freeze the beans to a temperature of about 7° C. During freezing beans regained most of the moisture lost from the surface during drying and had a moisture content of 64.31%. After freezing, the beans were packed in plastic and stored in a storage freezer at −18° C. for later use. Beans were stored in the freezer with no noticeable decline in quality.

The frozen beans remained loose and separate and did not stick together. After storage in the freezer, a desired number of beans could easily be poured from a package. Removed beans were thawed and subject to taste tests. The thawed beans were intact and had a good appearance with no fissures, ruptures or wrinkles. In taste tests, the thawed beans were found to have organoleptic properties, taste and mouthfeel comparable to freshly boiled beans.

Example 2

Romano Beans 45.36 Kg of dried Romano beans, with a moisture content of 11.9%, were soaked in water for 8 to 12 hours. After soaking 77.0 Kg of drained beans with a moisture content of 47.8%, were recovered. The beans were then boiled for 13 minutes in a kettle with a steam jacket set at a pressure of 21 psi, reaching a temperature of 99° C. The cooked beans weighed 101.0 Kg. After cooking, the beans were cooled to approximately 27° C. and quickly surface dried for 30 to 45 seconds in a vibrating bed dryer on a 12.5 feet long moving belt at a temperature of from 110 to 160° F. Beans exiting the drier had a moisture content of about 62% and were rapidly frozen in a nitrogen tunnel freezer kept at −80° F. to flash freeze the beans to a temperature of about −7° C. After freezing, the beans were packed in plastic and stored in a storage freezer at −18° C. for later use. Beans were stored in the freezer with no noticeable decline in quality.

The frozen beans remained loose and separate and did not stick together. After storage in the freezer, a desired number of beans could easily be poured from a package. Removed beans were thawed and subject to taste tests. The thawed beans were intact and had a good appearance with no fissures, ruptures or wrinkles. In taste tests, the thawed beans were found to have organoleptic properties, taste and mouthfeel comparable to freshly boiled beans.

All publications, patents and patent applications referred to herein are incorporated by reference in their entirety to the same extent as if each individual publication, patent or patent application was specifically and individually indicated to be incorporated by reference in its entirety.

I claim:

1. A process for preparing individually frozen pulses, comprising the steps of: soaking dried pulses in water; boiling the pulses in water; quickly surface-drying the pulses in hot forced air to remove from about 1% to 2% of total moisture content from the pulses; and flash freezing the dried pulses.

2. A process as claimed in claim 1 wherein the pulses are beans.

3. A process as claimed in claim 2 wherein the beans are Romano or garbanzo beans.

4. A process as claimed in claim 2 wherein the beans are soaked for between 8 to 16 hours at between 5 to 70° C.

5. A process as claimed in claim 2 wherein the surface-drying and flash freezing are carried out on a moving belt production line.

6. A process as claimed in claim 1 wherein the surface-drying is sufficient to remove about 2% of total moisture content from the beans.

7. A process as claimed in claim 2 wherein the hot forced air is at a temperature of from about 110 to 160° F.

8. A process as claimed in claim 2 wherein the beans are surface-dried in hot forced air in a vibrating bed drier.

9. A process as claimed in claim 8 wherein the hot forced air is applied for a time of from about 10 to 60 seconds.

10. A process as claimed in claim 8 wherein the beans are dried on a moving belt in said vibrating bed drier.

11. A process as claimed in claim 2 wherein the dried beans are flash frozen in a nitrogen tunnel freezer.

12. A process for preparing individually frozen beans, comprising the steps of: soaking dried beans in water for about from 8 to 16 hours; boiling the beans in water for about from 12 to 13 minutes; quickly surface-drying the beans for a time of about 30 to 45 seconds in hot forced air at a temperature of from about 110 to 160° F. in a vibrating bed drier to remove about 2% of total moisture content from the beans, and; flash freezing the surface-dried beans in a nitrogen tunnel freezer.

* * * * *